US012589993B2

(12) United States Patent
Alqahtani et al.

(10) Patent No.: US 12,589,993 B2
(45) Date of Patent: Mar. 31, 2026

(54) METHODS FOR PHOTOCATALYTIC WATER SPLITTING OF PRODUCED WATERS

(71) Applicant: SAUDI ARABIAN OIL COMPANY, Dhahran (SA)

(72) Inventors: Hassan Sakar Alqahtani, Dhahran (SA); Fahd Ibrahim Alghunaimi, Dhahran (SA); Khalid Yahya Hazazi, Thuwal (SA); Salah Hamad Al-Saleh, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/664,126

(22) Filed: May 14, 2024

(65) Prior Publication Data

US 2025/0353738 A1 Nov. 20, 2025

(51) Int. Cl.
$$\begin{array}{ll} \textit{C01B 3/04} & (2006.01) \\ \textit{C01B 3/042} & (2026.01) \\ \textit{C01B 13/02} & (2006.01) \end{array}$$

(52) U.S. Cl.
CPC .......... *C01B 3/042* (2013.01); *C01B 13/0207* (2013.01); *C01B 2203/0277* (2013.01); *C01B 2203/1094* (2013.01)

(58) Field of Classification Search
CPC ...................................................... C01B 3/042
See application file for complete search history.

(56) References Cited

U.S. PATENT DOCUMENTS

| | | | |
|---|---|---|---|
| 10,047,027 B1 * | 8/2018 | Gondal | C07C 31/04 |
| 2012/0145532 A1 * | 6/2012 | Smolyakov | B01J 21/063 |
| | | | 977/773 |
| 2015/0076002 A1 * | 3/2015 | Andrews | C02F 1/325 |
| | | | 205/744 |
| 2019/0202692 A1 * | 7/2019 | Adachi | B01J 23/745 |
| 2020/0024754 A1 * | 1/2020 | Khan | C25B 11/049 |

OTHER PUBLICATIONS

Izumi, "Recent advances in the photocatalytic conversion of carbon dioxide to fuels with water and/or hydrogen using solar energy and beyond," Coordination Chemistry Reviews, 2013, 257 (1), 72 pages.

Sastre et al., "Visible-Light Photocatalytic Conversion of Carbon Monoxide to Methane by Nickel (II) Oxide," Angewandte Chemie 2013, 125 (49), 13221-13225.

Rajalakshmi et al., "Photocatalytic reduction of carbon dioxide by water on titania: Role of photophysical and structural properties," Indian Journal of Chemistry, vol. 51A, Mar. 2012, pp. 411-419.

Bernhardt et al., "Chemical and catalytic properties of size-selected free and supported clusters," in Nanocatalysis, Springer: 2007, pp. 1-191.

Jeyalakshmi et al., "Titania based catalysts for photoreduction of carbon dioxide: Role of modifiers," Indian Journal of Chemistry, vol. 51A, Sep.-Oct. 2012, pp. 1263-1283.

Fujishima, A.; Honda, K., Electrochemical Photolysis of Water at a Semiconductor Electrode. Nature 1972, 238, 37-38.

* cited by examiner

*Primary Examiner* — Paul A Wartalowicz

(74) *Attorney, Agent, or Firm* — Vorys, Sater, Seymour and Pease LLP

(57) ABSTRACT

Methods for photocatalytic water splitting of produced waters may comprise introducing a photocatalyst comprising a semiconductor to a produced water comprising ions of sodium, chloride, calcium, magnesium, potassium, sulfate, barium, iron, lithium, strontium, or any combination thereof; in the presence of sunlight, allowing the photocatalyst to facilitate a reduction-oxidation reaction of a plurality of water molecules from the produced water; and obtaining hydrogen and oxygen.

17 Claims, No Drawings

METHODS FOR PHOTOCATALYTIC WATER SPLITTING OF PRODUCED WATERS

FIELD OF THE DISCLOSURE

The present disclosure relates generally to photocatalytic water splitting and, more particularly, to photocatalytic water splitting of produced water.

BACKGROUND OF THE DISCLOSURE

The global drive toward sustainable and renewable energy sources has become an urgent priority, with the emphasis increasingly on solar energy as a leading candidate in this shift. This transition underscores the need for a reliable energy supply, ideally available at all times of the day. However, solar energy's primary limitation, its availability only during daylight hours, positions energy storage as a critical factor in its practical application. In this scenario, hydrogen emerges as a standout solution for storing solar energy, facilitating its usage throughout the day and night. Utilizing water as a hydrogen source, with solar energy as the conversion catalyst, exemplifies a promising approach to achieving this goal. Within this framework, the role of photocatalysis becomes indispensable.

Photocatalysis, the process of accelerating a chemical reaction using light in the presence of a catalyst, plays a pivotal role in solar energy conversion. The essence of this process is in the catalyst's capacity to absorb light and generate electron-hole pairs, which are essential for triggering and sustaining secondary reduction-oxidation reactions. This capability has made the application of photocatalysis in water splitting for hydrogen production a focal point of interest, making it a leading strategy for generating renewable energy.

Despite the potential, the efficient division of water into hydrogen and oxygen via photocatalysts presents a formidable challenge that has engaged researchers for years. The appeal of leveraging renewable energy for this purpose is its ability to mitigate environmental concerns and contribute to energy sustainability. Nonetheless, the quest for developing high-efficiency photocatalysts for water splitting has encountered substantial hurdles, mainly due to the thermodynamic difficulties inherent in the reaction. These obstacles notwithstanding, the relentless pursuit of innovative photocatalytic materials and techniques is unwavering, motivated by the transformative promise of photocatalytic water splitting in propelling hydrogen production forward. This pursuit not only has the potential to surmount existing energy challenges but also significantly impacts the global energy landscape, marking a significant stride toward achieving a sustainable energy future.

SUMMARY OF THE DISCLOSURE

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, methods for photocatalytic water splitting of produced waters may comprise introducing a photocatalyst comprising a semiconductor to a produced water comprising ions of sodium, chloride, calcium, magnesium, potassium, sulfate, barium, iron, lithium, strontium, or any combination thereof; in the presence of sunlight, allowing the photocatalyst to facilitate a reduction-oxidation reaction of a plurality of water molecules from the produced water; and obtaining hydrogen and oxygen.

In another embodiment, methods for photocatalytic water splitting of produced waters may comprise introducing a photocatalyst comprising a semiconductor to a produced water having a total dissolved solids concentration of about 3 ppm to about 60,000 ppm and comprising ions of sodium, chloride, calcium, magnesium, potassium, sulfate, barium, iron, lithium, strontium, or any combination thereof; wherein the semiconductor comprises titanium dioxide, a perovskite, indium gallium nitride, or any combination thereof; adsorbing a plurality of water molecules from the produced water onto a surface of the photocatalyst; absorbing a photon energy from the sunlight by the photocatalyst greater than a band-gap energy of the semiconductor; generating a plurality of photoexcited electron hole pairs within the photocatalyst that migrate to the surface of the photocatalyst thereby facilitating a reduction-oxidation reaction of the plurality of water molecules; and obtaining hydrogen and oxygen.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

BRIEF DESCRIPTION OF THE DRAWINGS

Not applicable.

DETAILED DESCRIPTION

Embodiments in accordance with the present disclosure generally relate to photocatalytic water splitting and, more particularly, to photocatalytic water splitting of a "produced water," which refers to a water produced as a byproduct from oil and gas extraction processes. As previously mentioned, photocatalysis constitutes a pivotal advancement within the domain of renewable energy, leveraging photonic energy to markedly augment the efficacy of solar energy conversion through catalytic mechanisms. Central to this process is the catalytic material's intrinsic ability to absorb photons, facilitating the generation of electron-hole pairs that are instrumental in catalyzing secondary reduction-oxidation reactions. This capability is of significant importance for the progression of green technologies, particularly in the context of renewable energy generation.

Semiconductor materials including titanium dioxide, perovskites, and indium gallium nitride possess excellent photocatalytic performance. These materials have demonstrated exceptional proficiency in enabling the water-splitting reaction, a key process in the production of hydrogen. Given the increasing recognition of hydrogen as a clean and sustainable energy carrier, the deployment of these semiconductor photocatalysts under sunlight marks a critical advancement in the pursuit of efficient and environmentally friendly energy solutions.

Moreover, the investigation into alternative water sources for hydrogen production unveils innovative avenues in sustainable energy research. Specifically, the utilization of a produced water as a feedstock for photocatalytic hydrogen generation under sunlight, introduces a resourceful approach to resource management. This strategy effectively addresses the challenges of sourcing appropriate water for hydrogen production and embraces the circular economy principles by repurposing industrial waste into inputs for clean energy production.

Employing advanced semiconductor photocatalysts that are proficient in harnessing sunlight for photocatalytic reactions to process these unconventional water sources may significantly enhance environmental sustainability. It may do so by reducing waste and diminishing the carbon footprint associated with energy production. The synergy between semiconductor photocatalysis under sunlight and the strategic use of alternative water resources in the water-splitting process potentially signifies a major evolution in renewable energy technologies. It may represent a holistic approach to sustainable development, addressing both energy and environmental challenges while marking a significant stride toward a sustainable and energy-secure global future.

Therefore, a non-limiting example method for photocatalytic water splitting of produced waters may comprise introducing a photocatalyst comprising a semiconductor to a produced water comprising ions of sodium, chloride, calcium, magnesium, potassium, sulfate, barium, iron, lithium, strontium, or any combination thereof; in the presence of sunlight, allowing the photocatalyst to facilitate a reduction-oxidation reaction of a plurality of water molecules from the produced water; and obtaining hydrogen and oxygen.

Furthermore, another non-limiting example method for photocatalytic water splitting of produced waters may comprise introducing a photocatalyst comprising a semiconductor to a produced water having a total dissolved solids concentration of about 3 ppm to about 60,000 ppm and comprising ions of sodium, chloride, calcium, magnesium, potassium, sulfate, barium, iron, lithium, strontium, or any combination thereof, wherein the semiconductor comprises titanium dioxide, a perovskite, indium gallium nitride, or any combination thereof; adsorbing a plurality of water molecules from the produced water onto a surface of the photocatalyst; absorbing a photon energy from the sunlight by the photocatalyst greater than a band-gap energy of the semiconductor; generating a plurality of photoexcited electron hole pairs within the photocatalyst that migrate to the surface of the photocatalyst thereby facilitating a reduction-oxidation reaction of the plurality of water molecules; and obtaining hydrogen and oxygen.

Suitable photocatalysts for use in the methods of the present disclosure may include semiconductor materials capable of facilitating a reduction-oxidation reaction of water in the presence of UV light and/or visible light (e.g., sunlight). Two main groups of elements may act as active cation components in water-splitting photocatalysts: photocatalysts based on transition-metal cations with empty d orbitals (defined as having a $d^0$ electronic configuration), for example $Ti^{4+}$, $Zr^{4+}$, $Nb^{5+}$, $Ta^{5+}$, $W^{6+}$, and $Ce^{4+}$; and photocatalysts based on typical metal cations with filled d orbitals (defined as having a $d^{10}$ electronic configuration), for example $Ga^{3+}$, $In^{3+}$, $Ge^{4+}$, $Sn^{4+}$, and $Sb^{5+}$. Given this distinction, examples of suitable semiconductors include titanium dioxide, a perovskite (e.g., calcium titanate), indium gallium nitride, the like, and any combination thereof.

Without being bound by theory, the production of hydrogen and oxygen from the produced water via the photocatalyst may be achieved by the following mechanism. First, after the adsorption of water molecules onto the surface of the photocatalyst, the photocatalyst may absorb photon energy from sunlight greater than a band-gap energy of the photocatalyst material. As used herein, the term "band-gap energy" refers to an energy range in a solid in which no electronic states exist. Moreover, the band gap refers to the energy difference between the top of the valence band and the bottom of the conduction band. The absorption of the photon energy may generate photoexcited electron hole pairs in the bulk of the photocatalyst. Next, the photoexcited electron carriers may separate and migrate to the surface without recombination. Finally, the adsorbed species (the water molecules) are reduced and oxidized by the photogenerated electrons and holes to produce hydrogen and oxygen, respectively. The first and second steps of photon absorption and separation of photoexcited carriers may be strongly dependent on the structural and electronic properties of the photocatalyst. In general, high crystallinity may have a positive effect on activity since the density of defects, which act as recombination centers between photogenerated carriers, may decrease with increasing crystallinity. Higher photocatalytic activity may be similarly obtained by reducing the particle size of the photocatalyst due to the shortened diffusion length for the photogenerated electron hole pairs. The final step of reduction and oxidation, however, may be promoted by the presence of a solid cocatalyst. The cocatalyst may comprise a noble metal (e.g., Pt or Rh) or a transition-metal oxide (e.g., $NiO_x$ or $RuO_2$) and may be loaded onto the photocatalyst surface to produce active sites and reduce the activation energy for the evolution of hydrogen and oxygen.

To promote the production of hydrogen and oxygen from the produced water, the photocatalysts (e.g., nano-scale titanium dioxide, a perovskite, indium gallium nitride, or any combination thereof) may be applied to a panel reactor system in which one or more photocatalysts may be deposited on a thin film within a glass reactor. This panel reactor system may allow the produced water to contact the photocatalyst, thus producing the hydrogen and oxygen gases.

In any embodiment, the water used in the water splitting methods of the present disclosure may be alternatively sourced. For example, the water may preferably comprise produced water. As used herein, the term "produced water" refers to water that is produced as a byproduct during the extraction of oil and natural gas. This produced water may be stored in ponds in which the photocatalytic reaction takes place. The produced water may be brackish and have a high salinity. For example, the produced water may comprise ions of sodium, chloride, calcium, magnesium, potassium, sulfate, barium, iron, lithium, strontium, the like, and any combination thereof.

In any embodiment, the produced water may, for example, have a concentration of total dissolved solids of about 3 ppm to about 60,000 ppm, or about 3 ppm to about 50,000 ppm, or about 3 ppm to about 10,000 ppm, or about 3 ppm to about 1,000 ppm, or about 3 ppm to about 100 ppm, or about 100 ppm to about 60,000 ppm, or about 100 ppm to about 50,000 ppm, or about 100 ppm to about 10,000 ppm, or about 100 ppm to about 1,000 ppm, or about 1,000 ppm to about 60,000 ppm, or about 1,000 ppm to about 50,000 ppm, or about 1,000 ppm to about 10,000 ppm, or about 10,000 ppm to about 60,000 ppm, or about 10,000 ppm to about 50,000 ppm, or about 50,000 ppm to about 60,000 ppm.

In any embodiment, the produced water may, for example, have a concentration of sodium ions of about 10 mg/L to about 50 mg/L, or about 10 mg/L to about 40 mg/L, or about 10 mg/L to about 30 mg/L, or about 10 mg/L to about 20 mg/L, or about 20 mg/L to about 50 mg/L, or about 20 mg/L to about 40 mg/L, or about 20 mg/L to about 30 mg/L, or about 30 mg/L to about 50 mg/L, or about 30 mg/L to about 40 mg/L, or about 40 mg/L to about 50 mg/L.

In any embodiment, the produced water may, for example, have a concentration of chloride ions of about 1 mg/L to about 50 mg/L, or about 1 mg/L to about 40 mg/L, or about 1 mg/L to about 30 mg/L, or about 1 mg/L to about 20 mg/L, or about 1 mg/L to about 10 mg/L, or about 10 mg/L to about 50 mg/L, or about 10 mg/L to about 40 mg/L, or about 10 mg/L to about 30 mg/L, or about 10 mg/L to about 20 mg/L, or about 20 mg/L to about 50 mg/L, or about 20 mg/L to about 40 mg/L, or about 20 mg/L to about 30 mg/L, or about 30 mg/L to about 50 mg/L, or about 30 mg/L to about 40 mg/L, or about 40 mg/L to about 50 mg/L.

In any embodiment, the produced water may, for example, have a concentration of calcium ions of about 0.001 mg/L to about 10 mg/L, or about 0.001 mg/L to about 1 mg/L, or about 0.001 mg/L to about 0.1 mg/L, or about 0.001 mg/L to about 0.01 mg/L, or about 0.01 mg/L to about 10 mg/L, or about 0.01 mg/L to about 1 mg/L, or about 0.01 mg/L to about 0.1 mg/L, or about 0.1 mg/L to about 10 mg/L, or about 0.1 mg/L to about 1 mg/L, or about 1 mg/L to about 10 mg/L.

In any embodiment, the produced water may, for example, have a concentration of magnesium ions of about 0.001 mg/L to about 10 mg/L, or about 0.001 mg/L to about 1 mg/L, or about 0.001 mg/L to about 0.1 mg/L, or about 0.001 mg/L to about 0.01 mg/L, or about 0.01 mg/L to about 10 mg/L, or about 0.01 mg/L to about 1 mg/L, or about 0.01 mg/L to about 0.1 mg/L, or about 0.1 mg/L to about 10 mg/L, or about 0.1 mg/L to about 1 mg/L, or about 1 mg/L to about 10 mg/L.

In any embodiment, the produced water may, for example, have a concentration of potassium ions of about 1 mg/L to about 50 mg/L, or about 1 mg/L to about 40 mg/L, or about 1 mg/L to about 30 mg/L, or about 1 mg/L to about 20 mg/L, or about 1 mg/L to about 10 mg/L, or about 10 mg/L to about 50 mg/L, or about 10 mg/L to about 40 mg/L, or about 10 mg/L to about 30 mg/L, or about 10 mg/L to about 20 mg/L, or about 20 mg/L to about 50 mg/L, or about 20 mg/L to about 40 mg/L, or about 20 mg/L to about 30 mg/L, or about 30 mg/L to about 50 mg/L, or about 30 mg/L to about 40 mg/L, or about 40 mg/L to about 50 mg/L.

In any embodiment, the produced water may, for example, have a concentration of sulfate ions of about 1 mg/L to about 50 mg/L, or about 1 mg/L to about 40 mg/L, or about 1 mg/L to about 30 mg/L, or about 1 mg/L to about 20 mg/L, or about 1 mg/L to about 10 mg/L, or about 10 mg/L to about 50 mg/L, or about 10 mg/L to about 40 mg/L, or about 10 mg/L to about 30 mg/L, or about 10 mg/L to about 20 mg/L, or about 20 mg/L to about 50 mg/L, or about 20 mg/L to about 40 mg/L, or about 20 mg/L to about 30 mg/L, or about 30 mg/L to about 50 mg/L, or about 30 mg/L to about 40 mg/L, or about 40 mg/L to about 50 mg/L.

In any embodiment, the produced water may, for example, have a concentration of barium ions of about 0.001 mg/L to about 10 mg/L, or about 0.001 mg/L to about 1 mg/L, or about 0.001 mg/L to about 0.1 mg/L, or about 0.001 mg/L to about 0.01 mg/L, or about 0.01 mg/L to about 10 mg/L, or about 0.01 mg/L to about 1 mg/L, or about 0.01 mg/L to about 0.1 mg/L, or about 0.1 mg/L to about 10 mg/L, or about 0.1 mg/L to about 1 mg/L, or about 1 mg/L to about 10 mg/L.

In any embodiment, the produced water may, for example, have a concentration of iron ions of about 0.001 mg/L to about 10 mg/L, or about 0.001 mg/L to about 1 mg/L, or about 0.001 mg/L to about 0.1 mg/L, or about 0.001 mg/L to about 0.01 mg/L, or about 0.01 mg/L to about 10 mg/L, or about 0.01 mg/L to about 1 mg/L, or about 0.01 mg/L to about 0.1 mg/L, or about 0.1 mg/L to about 10 mg/L, or about 0.1 mg/L to about 1 mg/L, or about 1 mg/L to about 10 mg/L.

In any embodiment, the produced water may, for example, have a concentration of lithium ions of about 1 mg/L to about 50 mg/L, or about 1 mg/L to about 40 mg/L, or about 1 mg/L to about 30 mg/L, or about 1 mg/L to about 20 mg/L, or about 1 mg/L to about 10 mg/L, or about 10 mg/L to about 50 mg/L, or about 10 mg/L to about 40 mg/L, or about 10 mg/L to about 30 mg/L, or about 10 mg/L to about 20 mg/L, or about 20 mg/L to about 50 mg/L, or about 20 mg/L to about 40 mg/L, or about 20 mg/L to about 30 mg/L, or about 30 mg/L to about 50 mg/L, or about 30 mg/L to about 40 mg/L, or about 40 mg/L to about 50 mg/L.

In any embodiment, the produced water may, for example, have a concentration of strontium ions of about 0.001 mg/L to about 10 mg/L, or about 0.001 mg/L to about 1 mg/L, or about 0.001 mg/L to about 0.1 mg/L, or about 0.001 mg/L to about 0.01 mg/L, or about 0.01 mg/L to about 10 mg/L, or about 0.01 mg/L to about 1 mg/L, or about 0.01 mg/L to about 0.1 mg/L, or about 0.1 mg/L to about 10 mg/L, or about 0.1 mg/L to about 1 mg/L, or about 1 mg/L to about 10 mg/L.

In addition to produced water, the water may optionally comprise fresh water, seawater, ground water, surface water, DI water, non-potable water, wastewater, the like, and any combination thereof.

Embodiments disclosed herein include:

A. Methods for photocatalytic water splitting of produced waters comprising introducing a photocatalyst comprising a semiconductor to a produced water comprising ions of sodium, chloride, calcium, magnesium, potassium, sulfate, barium, iron, lithium, strontium, or any combination thereof; in the presence of sunlight, allowing the photocatalyst to facilitate a reduction-oxidation reaction of a plurality of water molecules from the produced water; and obtaining hydrogen and oxygen.

B. Methods for photocatalytic water splitting of produced waters comprising introducing a photocatalyst comprising a semiconductor to a produced water having a total dissolved solids concentration of about 3 ppm to about 60,000 ppm and comprising ions of sodium, chloride, calcium, magnesium, potassium, sulfate, barium, iron, lithium, strontium, or any combination thereof; wherein the semiconductor comprises titanium dioxide, a perovskite, indium gallium nitride, or any combination thereof; adsorbing a plurality of water molecules from the produced water onto a surface of the photocatalyst; absorbing a photon energy from the sunlight by the photocatalyst greater than a band-gap energy of the semiconductor; generating a plurality of photoexcited electron hole pairs within the photocatalyst that migrate to the surface of the photocatalyst thereby facilitating a reduction-oxidation reaction of the plurality of water molecules; and obtaining hydrogen and oxygen.

Each of embodiments A and B may have one or more of the following additional elements in any combination:

Element 1: wherein the semiconductor comprises titanium dioxide, a perovskite, indium gallium nitride, or any combination thereof.

Element 2: the methods further comprising adsorbing the plurality of water molecules from the produced water onto a surface of the photocatalyst; absorbing a photon energy from the sunlight by the photocatalyst greater than a band-gap energy of the semiconductor; and generating a plurality of photoexcited electron hole pairs within the photocatalyst that migrate to the surface of the photocatalyst thereby facilitating the reduction-oxidation reaction.

Element 3: wherein the produced water has a total dissolved solids concentration of about 3 ppm to about 60,000 ppm.

Element 4: wherein the produced water has a concentration of sodium ions of about 10 mg/L to about 50 mg/L.

Element 5: wherein the produced water has a concentration of chloride ions of about 1 mg/L to about 50 mg/L.

Element 6: wherein the produced water has a concentration of calcium ions of about 0.001 mg/L to about 10 mg/L.

Element 7: wherein the produced water has a concentration of magnesium ions of about 0.001 mg/L to about 10 mg/L.

Element 8: wherein the produced water has a concentration of potassium ions of about 1 mg/L to about 50 mg/L.

Element 9: wherein the produced water has a concentration of sulfate ions of about 1 mg/L to about 50 mg/L.

Element 10: wherein the produced water has a concentration of barium ions of about 0.001 mg/L to about 10 mg/L.

Element 11: wherein the produced water has a concentration of iron ions of about 0.001 mg/L to about 10 mg/L.

Element 12: wherein the produced water has a concentration of lithium ions of about 1 mg/L to about 50 mg/L.

Element 13: wherein the produced water has a concentration of strontium ions of about 0.001 mg/L to about 10 mg/L.

By way of non-limiting example, exemplary combinations applicable to A and B include: 1 with 2; 1 with 3; 1 with 4; 1 with 5; 1 with 6; 1 with 7; 1 with 8; 1 with 9; 1 with 10; 1 with 11; 1 with 12; 1 with 13; 2 with 3; 2 with 4; 2 with 5; 2 with 6; 2 with 7; 2 with 8; 2 with 9; 2 with 10; 2 with 11; 2 with 12; 2 with 13; 3 with 4; 3 with 5; 3 with 6; 3 with 7; 3 with 8; 3 with 9; 3 with 10; 3 with 11; 3 with 12; 3 with 13; 4 with 5; 4 with 6; 4 with 7; 4 with 8; 4 with 9; 4 with 10; 4 with 11; 4 with 12; 4 with 13; 5 with 6; 5 with 7; 5 with 8; 5 with 9; 5 with 10; 5 with 11; 5 with 12; 5 with 13; 6 with 7; 6 with 8; 6 with 9; 6 with 10; 6 with 11; 6 with 12; 6 with 13; 7 with 8; 7 with 9; 7 with 10; 7 with 11; 7 with 12; 7 with 13; 8 with 9; 8 with 10; 8 with 11; 8 with 12; 8 with 13; 9 with 10; 9 with 11; 9 with 12; 9 with 13; 10 with 11; 10 with 12; 10 with 13; 11 with 12; 11 with 13; 12 with 13; 1 with 2 and 3; 2 with 3 and 4; 3 with 4 and 5; 4 with 5 and 6; 5 with 6 and 7; 6 with 7 and 8; 7 with 8 and 9; 8 with 9 and 10; 9 with 10 and 11; 10 with 11 and 12; and 11 with 12 and 13.

The present disclosure is further directed to the following non-limiting clauses:

Clause 1. A method comprising:
introducing a photocatalyst comprising a semiconductor to a produced water comprising ions of sodium, chloride, calcium, magnesium, potassium, sulfate, barium, iron, lithium, strontium, or any combination thereof;
in the presence of sunlight, allowing the photocatalyst to facilitate a reduction-oxidation reaction of a plurality of water molecules from the produced water; and
obtaining hydrogen and oxygen.

Clause 2. The method of clause 1, wherein the semiconductor comprises titanium dioxide, a perovskite, indium gallium nitride, or any combination thereof.

Clause 3. The method of clause 1 or clause 2, further comprising:
adsorbing the plurality of water molecules from the produced water onto a surface of the photocatalyst;
absorbing a photon energy from the sunlight by the photocatalyst greater than a band-gap energy of the semiconductor; and
generating a plurality of photoexcited electron hole pairs within the photocatalyst that migrate to the surface of the photocatalyst thereby facilitating the reduction-oxidation reaction.

Clause 4. The method of any one of clauses 1-3, wherein the produced water has a total dissolved solids concentration of about 3 ppm to about 60,000 ppm.

Clause 5. The method of any one of clauses 1-4, wherein the produced water has a concentration of sodium ions of about 10 mg/L to about 50 mg/L.

Clause 6. The method of any one of clauses 1-5, wherein the produced water has a concentration of chloride ions of about 1 mg/L to about 50 mg/L.

Clause 7. The method of any one of clauses 1-6, wherein the produced water has a concentration of calcium ions of about 0.001 mg/L to about 10 mg/L.

Clause 8. The method of any one of clauses 1-7, wherein the produced water has a concentration of magnesium ions of about 0.001 mg/L to about 10 mg/L.

Clause 9. The method of any one of clauses 1-8, wherein the produced water has a concentration of potassium ions of about 1 mg/L to about 50 mg/L.

Clause 10. The method of any one of clauses 1-9, wherein the produced water has a concentration of sulfate ions of about 1 mg/L to about 50 mg/L.

Clause 11. The method of any one of clauses 1-10, wherein the produced water has a concentration of barium ions of about 0.001 mg/L to about 10 mg/L.

Clause 12. The method of any one of clauses 1-11, wherein the produced water has a concentration of iron ions of about 0.001 mg/L to about 10 mg/L.

Clause 13. The method of any one of clauses 1-12, wherein the produced water has a concentration of lithium ions of about 1 mg/L to about 50 mg/L.

Clause 14. The method of any one of clauses 1-13, wherein the produced water has a concentration of strontium ions of about 0.001 mg/L to about 10 mg/L.

Clause 15. A method comprising:
introducing a photocatalyst comprising a semiconductor to a produced water having a total dissolved solids concentration of about 3 ppm to about 60,000 ppm and comprising ions of sodium, chloride, calcium, magnesium, potassium, sulfate, barium, iron, lithium, strontium, or any combination thereof;
wherein the semiconductor comprises titanium dioxide, a perovskite, indium gallium nitride, or any combination thereof;
adsorbing a plurality of water molecules from the produced water onto a surface of the photocatalyst;
absorbing a photon energy from the sunlight by the photocatalyst greater than a band-gap energy of the semiconductor;
generating a plurality of photoexcited electron hole pairs within the photocatalyst that migrate to the surface of the photocatalyst thereby facilitating a reduction-oxidation reaction of the plurality of water molecules; and obtaining hydrogen and oxygen.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains," "containing," "includes," "including," "comprises," and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation used herein are merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

All documents described herein are incorporated by reference herein for purposes of all jurisdictions where such practice is allowed, including any priority documents and/or testing procedures to the extent they are not inconsistent with this text. As is apparent from the foregoing general description and the specific embodiments, while forms of the disclosure have been illustrated and described, various modifications can be made without departing from the spirit and scope of the disclosure. Accordingly, it is not intended that the disclosure be limited thereby. For example, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by one or more embodiments described herein. At the very least, and not as an attempt to limit the application of the doctrine of equivalents to the scope of the claim, each numerical parameter should at least be construed in light of the number of reported significant digits and by applying ordinary rounding techniques.

The invention claimed is:

1. A method comprising:

introducing a photocatalyst comprising a semiconductor comprising (i) titanium dioxide and/or a perovskite and (ii) indium gallium nitride, and a cocatalyst comprising a noble metal or a transition metal oxide, wherein the cocatalyst is on a surface of the photocatalyst, to a produced water comprising ions of sodium, chloride, calcium, magnesium, potassium, sulfate, barium, iron, lithium, strontium, or any combination thereof;

in the presence of sunlight, allowing the photocatalyst to facilitate a reduction-oxidation reaction of a plurality of water molecules from the produced water; and obtaining hydrogen and oxygen.

2. The method of claim 1, further comprising:

adsorbing the plurality of water molecules from the produced water onto a surface of the photocatalyst;

absorbing a photon energy from the sunlight by the photocatalyst greater than a band-gap energy of the semiconductor; and generating a plurality of photoexcited electron hole pairs within the photocatalyst that migrate to the surface of the photocatalyst thereby facilitating the reduction-oxidation reaction.

3. The method of claim 1, wherein the produced water has a total dissolved solids concentration of about 3 ppm to about 60,000 ppm.

4. The method of claim 1, wherein the produced water has a concentration of sodium ions of about 10 mg/L to about 50 mg/L.

5. The method of claim 1, wherein the produced water has a concentration of chloride ions of about 1 mg/L to about 50 mg/L.

6. The method of claim 1, wherein the produced water has a concentration of calcium ions of about 0.001 mg/L to about 10 mg/L.

7. The method of claim 1, wherein the produced water has a concentration of magnesium ions of about 0.001 mg/L to about 10 mg/L.

8. The method of claim 1, wherein the produced water has a concentration of potassium ions of about 1 mg/L to about 50 mg/L.

9. The method of claim 1, wherein the produced water has a concentration of sulfate ions of about 1 mg/L to about 50 mg/L.

10. The method of claim 1, wherein the produced water has a concentration of barium ions of about 0.001 mg/L to about 10 mg/L.

11. The method of claim 1, wherein the produced water has a concentration of iron ions of about 0.001 mg/L to about 10 mg/L.

12. The method of claim 1, wherein the produced water has a concentration of lithium ions of about 1 mg/L to about 50 mg/L.

13. The method of claim 1, wherein the produced water has a concentration of strontium ions of about 0.001 mg/L to about 10 mg/L.

14. The method of claim 1, wherein the produced water has three or more of the following characteristics:
   a total dissolved solids concentration of about 30,000 ppm to about 60,000 ppm;
   a concentration of sodium ions of about 25 mg/L to about 50 mg/L;
   a concentration of chloride ions of about 25 mg/L to about 50 mg/L;
   a concentration of calcium ions of about 2 mg/L to about 10 mg/L;
   a concentration of magnesium ions of about 2 mg/L to about 10 mg/L;
   a concentration of potassium ions of about 25 mg/L to about 50 mg/L;
   a concentration of sulfate ions of about 10 mg/L to about 50 mg/L;
   a concentration of barium ions of about 2 mg/L to about 10 mg/L; and,
   a concentration of iron ions of about 2 mg/L to about 10 mg/L.

15. The method of claim 1, wherein the produced water has the following characteristics:
   a total dissolved solids concentration of about 30,000 ppm to about 60,000 ppm;
   a concentration of sodium ions of about 25 mg/L to about 50 mg/L;
   a concentration of chloride ions of about 25 mg/L to about 50 mg/L;
   a concentration of calcium ions of about 2 mg/L to about 10 mg/L;
   a concentration of barium ions of about 2 mg/L to about 10 mg/L; and,
   a concentration of iron ions of about 2 mg/L to about 10 mg/L.

16. A method comprising:
   introducing a photocatalyst comprising a semiconductor and a cocatalyst comprising a noble metal or a transition metal oxide, wherein the cocatalyst is on a surface of the photocatalyst, to a produced water having a total dissolved solids concentration of about 3 ppm to about 60,000 ppm and comprising ions of sodium, chloride, calcium, magnesium, potassium, sulfate, barium, iron, lithium, strontium, or any combination thereof;
   wherein the semiconductor comprises (i) titanium dioxide and/or a perovskite, and (ii) indium gallium nitride; and the cocatalyst comprises Pt, Rh, $NiO_x$, or $RuO_2$;
   adsorbing a plurality of water molecules from the produced water onto a surface of the photocatalyst;
   absorbing a photon energy from the sunlight by the photocatalyst greater than a band-gap energy of the semiconductor;
   generating a plurality of photoexcited electron hole pairs within the photocatalyst that migrate to the surface of the photocatalyst thereby facilitating a reduction-oxidation reaction of the plurality of water molecules; and
   obtaining hydrogen and oxygen.

17. The method of claim 1, wherein the cocatalyst comprises Pt, Rh, $NiO_x$, or $RuO_2$.

\* \* \* \* \*